(12) United States Patent
Kim

(10) Patent No.: US 10,896,554 B2
(45) Date of Patent: Jan. 19, 2021

(54) APPARATUS AND METHOD FOR PROVIDING VEHICLE USER INTERFACE

(71) Applicants: HYUNDAI MOTOR COMPANY, Seoul (KR); KIA MOTORS CORPORATION, Seoul (KR)

(72) Inventor: Jin Gi Kim, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 272 days.

(21) Appl. No.: 15/813,635

(22) Filed: Nov. 15, 2017

(65) Prior Publication Data

US 2018/0165891 A1 Jun. 14, 2018

(30) Foreign Application Priority Data

Dec. 14, 2016 (KR) .................. 10-2016-0170509

(51) Int. Cl.
*G07C 5/00* (2006.01)
*B60K 35/00* (2006.01)
(Continued)

(52) U.S. Cl.
CPC .............. *G07C 5/008* (2013.01); *B60K 35/00* (2013.01); *B60K 37/02* (2013.01); *B60K 37/06* (2013.01);
(Continued)

(58) Field of Classification Search
CPC ........ B60K 35/00; B60K 37/02; B60K 37/06; B60K 2370/1442; B60K 2370/151; B60K 2370/55; B60K 2370/569; B60K 2370/573; B60K 2370/592; B60K 17/356; B60K 6/52; B60K 6/26; B60K 6/442; B60K 6/405; B60K 5/02; B60K 17/348; B60K 6/48; B60K 17/354; B60K 6/54; B60R 16/02; B60W 2550/404; B60W 50/08; B60W 10/06; B60W 2556/55; B60W 50/0098; B60W 10/02; B60W 10/08; B60W 20/20; G06F 3/0481; G06F 3/0484; G06F 16/9558; G06F 16/954; G07C 5/00; G07C 5/008; H04L 67/12; G06Q 10/10;
(Continued)

(56) References Cited

U.S. PATENT DOCUMENTS 9,288,665 B2 3/2016 Kato et al.
2017/0137280 A1* 5/2017 Achatz ................ B67D 7/02
(Continued)

FOREIGN PATENT DOCUMENTS

JP H11-17862 A 1/1999
JP 2003-095040 A 4/2003
(Continued)

*Primary Examiner* — Behrang Badii
(74) *Attorney, Agent, or Firm* — Morgan, Lewis & Bockius LLP

(57) ABSTRACT

A method of controlling an instrument panel (IP) device includes transmitting a vehicle identification number (VIN) to a telematics server through an IP application, receiving vehicle production information corresponding to the VIN from the telematics server, and displaying a button user interface (UI) classified as at least one group corresponding to the vehicle production information through the IP application.

14 Claims, 5 Drawing Sheets

(51) Int. Cl.
*B60W 50/08* (2020.01)
*H04L 29/08* (2006.01)
*B60K 37/02* (2006.01)
*B60R 16/02* (2006.01)
*B60K 37/06* (2006.01)
*G06Q 30/06* (2012.01)

(52) U.S. Cl.
CPC ............. *B60R 16/02* (2013.01); *B60W 50/08* (2013.01); *G07C 5/00* (2013.01); *H04L 67/12* (2013.01); *B60K 2370/1442* (2019.05); *B60K 2370/151* (2019.05); *B60K 2370/55* (2019.05); *B60K 2370/569* (2019.05); *B60K 2370/573* (2019.05); *B60K 2370/592* (2019.05); *B60W 2556/55* (2020.02); *G06Q 30/06* (2013.01)

(58) Field of Classification Search
CPC .. G06Q 10/087; G06Q 30/06; G06Q 30/0643; G06Q 30/08; G06Q 10/00; G06Q 10/0633; F16H 61/0006; A61L 9/015; B01D 53/44; B01D 53/72; B60H 3/0071; B60H 3/0078
See application file for complete search history.

(56) References Cited

U.S. PATENT DOCUMENTS

| | | | |
|---|---|---|---|
| 2017/0138463 A1* | 5/2017 | Kwon | F16H 59/105 |
| 2017/0199234 A1* | 7/2017 | Mouzakitis | G01M 17/007 |
| 2017/0277274 A1* | 9/2017 | Boblett | G06F 3/04817 |
| 2018/0074811 A1* | 3/2018 | Kiyama | H04L 67/10 |
| 2019/0169289 A1* | 6/2019 | Young | C07K 16/2866 |
| 2019/0287162 A1* | 9/2019 | Ismail | G06Q 10/10 |

FOREIGN PATENT DOCUMENTS

| | | |
|---|---|---|
| JP | 2007-526161 A | 9/2007 |
| JP | 2013-509033 A | 3/2013 |
| JP | 2015-062320 A | 4/2015 |
| KR | 10-2014-0072933 A | 6/2014 |
| KR | 10-2015-0069297 | 6/2015 |

* cited by examiner

APPARATUS AND METHOD FOR PROVIDING VEHICLE USER INTERFACE

This application claims the benefit of priority to Korean Patent Application No. 10-2016-0170509, filed on Dec. 14, 2016 with the Korean Intellectual Property Office, which is hereby incorporated by reference as if fully set forth herein.

TECHNICAL FIELD

The present disclosure relates to an apparatus and method for providing a vehicle user interface, and more particularly, to an apparatus and method for providing a user interface applied to a commercial vehicle or a large vehicle.

BACKGROUND

Large vehicles and commercial vehicles (e.g., busses and large trucks) include in-panel buttons that are mounted thereon and classified into various categories based on various special purposes and vehicle type characteristics.

Recently, vehicles with telematics, which is wireless communication technology for vehicles, have been extensively employed. Telematics is a necessary factor for a functions such as automatic driving using wireless communication technology and sensors mounted in a vehicle. Telematics is mainly applied to a device for generating a warning of vehicle security or states or warning sounds for warning of a distance to an external object. In addition, telematics may also include technology for controlling a vehicle state based on a communication network, such as remote observation and vehicle tracking.

Telematics may transmit information required by a vehicle in conjunction with an AVN device. The AVN device may output the received information through a display to provide the information to a driver.

There is a need for a method of outputting and inputting signals of a plurality of buttons installed on an instrument panel of a commercial vehicle or a large vehicle to an AVN device incorporating the aforementioned telematics.

SUMMARY

Accordingly, the present disclosure is directed to an apparatus and method for providing a vehicle user interface that substantially obviates one or more problems due to limitations and disadvantages of the related art.

An object of the present disclosure is to provide an apparatus and method for providing a vehicle user interface.

Another object of the present disclosure is to provide an apparatus and method for providing a vehicle user interface, for receiving user interface information on an instrument panel from a telematics server and providing the information to a driver.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling an instrument panel (IP) device includes transmitting a vehicle identification number (VIN) to a telematics server through an IP application, receiving vehicle production information corresponding to the VIN from the telematics server, and displaying a button user interface (UI) classified as at least one group corresponding to the production information through the IP application.

The method may further include transmitting a control signal input through the button UI to an electrical system corresponding to the control signal through an IP gateway.

The method may further include downloading the IP application from the telematics server.

The IP application may include each button UI for controlling at least one electrical system installed in a vehicle.

The button UI may include an icon indicating a function of at least one electrical system installed in a vehicle.

The production information may include at least one of vehicle model identification (ID), a vehicle body number, engine ID, transmission ID, an export country, a detailed vehicle model, or order option.

In another aspect of the present disclosure, a method of controlling an instrument panel (IP) device includes transmitting a vehicle identification number (VIN) to a telematics server through an IP application, receiving information on a button user interface (UI) classified as at least one group corresponding to the VIN from the telematics server, and displaying the button UI through the IP application using the information on the button UI.

The method may further include transmitting a control signal input through the button UI to an electrical system corresponding to the control signal through an IP gateway.

The method may further include downloading the IP application from the telematics server.

The IP application may include each button UI for controlling at least one electrical system installed in a vehicle.

The button UI may include an icon indicating a function of at least one electrical system installed in a vehicle.

The receiving of the information on the button UI may include receiving production information corresponding to the VIN searched by the telematics server and information on a button UI that matches the production information, and the production information may include at least one of vehicle model identification (ID), a vehicle body number, engine ID, transmission ID, an export country, a detailed vehicle model, or order option.

In another aspect of the present disclosure, a computer readable recording medium may have recorded thereon a program for executing the aforementioned method.

In another aspect of the present disclosure, an instrument panel (IP) device may include an input device configured to receive a vehicle identification number (VIN) transmitted to a telematics server, a communication device configured to receive vehicle production information corresponding to the VIN from the telematics server, a controller configured to search for information on a button user interface (UI) classified as at least one group corresponding to the production information in a memory, and an output device configured to display the button UI using the information on the button UI.

The controller may perform control to transmit a control signal input through the button UI to an electrical system corresponding to the control signal through an IP gateway.

The button UI may generate a control signal for controlling at least one electrical system installed a vehicle.

The button UI may include an icon indicating a function of at least one electrical system installed in a vehicle.

The production information may include at least one of vehicle model identification (ID), a vehicle body number, engine ID, transmission ID, an export country, a detailed vehicle model, or order option.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
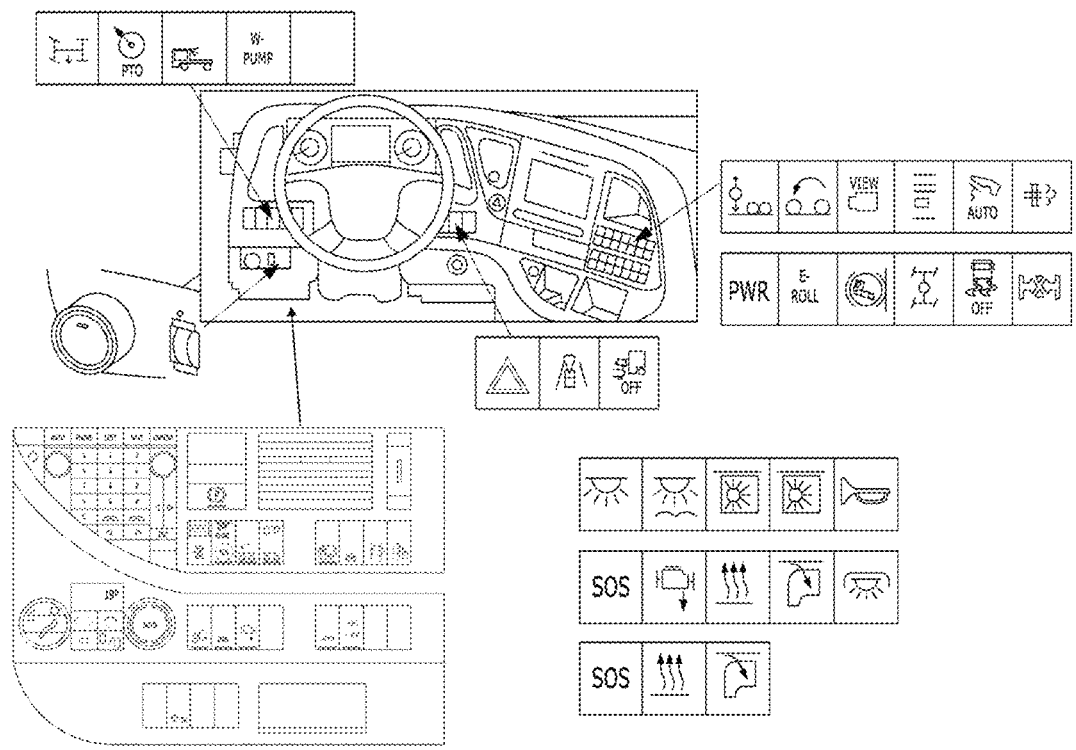
FIG. 1 is a diagram for explanation of an arrangement of various buttons included in a conventional instrument panel.

Reference will now be made in detail to the exemplary embodiments of the present disclosure, examples of which are illustrated in the accompanying drawings. The suffixes "module" and "unit" of elements herein are used for convenience of description and thus can be used interchangeably and do not have any distinguishable meanings or functions.

Although all elements constituting the embodiments of the present disclosure may be described as integrated into a single one or to be operated as a single one, the present disclosure is not necessarily limited to such embodiments. According to exemplary embodiments, all of the elements may be selectively integrated into one or more systems or elements or combinations and be operated as one or more systems or elements or combinations within the scope of the present disclosure. Each of the elements may be implemented as independent hardware. Alternatively, some or all of the elements may be selectively combined into a computer program having a program module for performing some or all functions combined in one or more pieces of hardware. Code and code segments constituting the computer program may be easily understood by those skilled in the art to which the present disclosure pertains. The computer program may be stored in computer readable media such that the computer program is read and executed by a computer to implement embodiments of the present disclosure. Computer program storage media may include magnetic recording media, optical recording media, and carrier wave media.

In description of exemplary embodiments, it will be understood that, when an element is referred to as being "on" or "under" and "before" or "after" another element, the element can be directly on another element or intervening elements may be present.

The terms "comprises", "includes", and "has" described herein should be interpreted not to exclude other elements but to further include such other elements since the corresponding elements may be included unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings in the related art from the context. Unless differently defined in the present disclosure, such terms should not be interpreted in an ideal or excessively formal manner.

It will be understood that, although the terms first, second, A, B, (a), (b), etc. may be used herein to describe various elements of the present disclosure, these terms are only used to distinguish one element from another element and a necessity, order and/or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

In the description of the present disclosure, certain detailed explanations of related art are omitted when it is deemed that they may unnecessarily obscure the essence of the disclosure.

FIG. 1 is a diagram for explanation of an arrangement of various buttons included in a conventional instrument panel.

Referring to FIG. 1, an instrument panel of a commercial vehicle may include various buttons mounted thereon for performing a function according to a specific purpose of a commercial vehicle.

The instrument panel is referred to using different terms for different vehicle manufacturers and, for example, is referred to as IN PANEL, INSTRUMENT PAD, CRASH PAD (or C/PAD), or DASHBOARD.

The instrument panel may include various dashboards of a vehicle, a glove box, an audio video navigation (AVN) device, an air conditioning device, a console, a cup holder, center fascia, various storage devices, an airbag, other electronic devices, and wirings, and a body for providing a region for installing and electronically connecting these components. The phrase "Instrument Panel" is often abbreviated to IP MODULE or IP. The IP MODULE may refer to a main body formed by assembling some or all of the aforementioned components or, in a narrow sense, refer to only a main body without the components.

As illustrated in FIG. 1, various types of buttons may be arranged in a region controllable by a driver. However, it is difficult to ensure a place for positioning buttons in order to position a plurality of of buttons within a predetermined range (distance) of a driver's seat. There is a problem in that it is difficult to form a mold with an intricate shape while avoiding increased manufacturing costs due to the intricate shape during manufacture of the instrument panel. In addition, an interior design may be restricted due to problems with positioning a plurality of buttons.

Referring to FIG. 1, buttons that are classified into various types are arranged within a predetermined distance of a driver's seat. A large commercial vehicle may include about 30 or more buttons that are mounted on an instrument panel of a driver's seat.

In general, the buttons of the instrument panel may be classified into separate buttons or groups that perform a similar function and occupy an area proportional to the number of the buttons. The buttons disposed on the instrument panel may be developed and mounted using molds according to purposes, for example, a push return method, a push lock method, or a 3-position method.

As such, when various types and a large number of buttons need to be mounted on the instrument panel, there may be problems in that it is difficult to ensure a place for positioning buttons, manufacturing costs increase due to an intricate instrument panel, an interior design of a vehicle is limited due to restrictions of a button arrangement, material costs increase due to an increase in the number of buttons, the possibility of error during an operation increases due to different types and numbers of buttons for respective vehicle options and vehicles for special purposes and a driver does may fully understand functions of buttons.

Accordingly, the present disclosure proposes a method and apparatus for providing a user interface for providing an instrument panel button through an output and input device of an audio video navigation (AVN) system using telematics, which will be described with reference to FIGS. 2 to 7.

Figure 2:
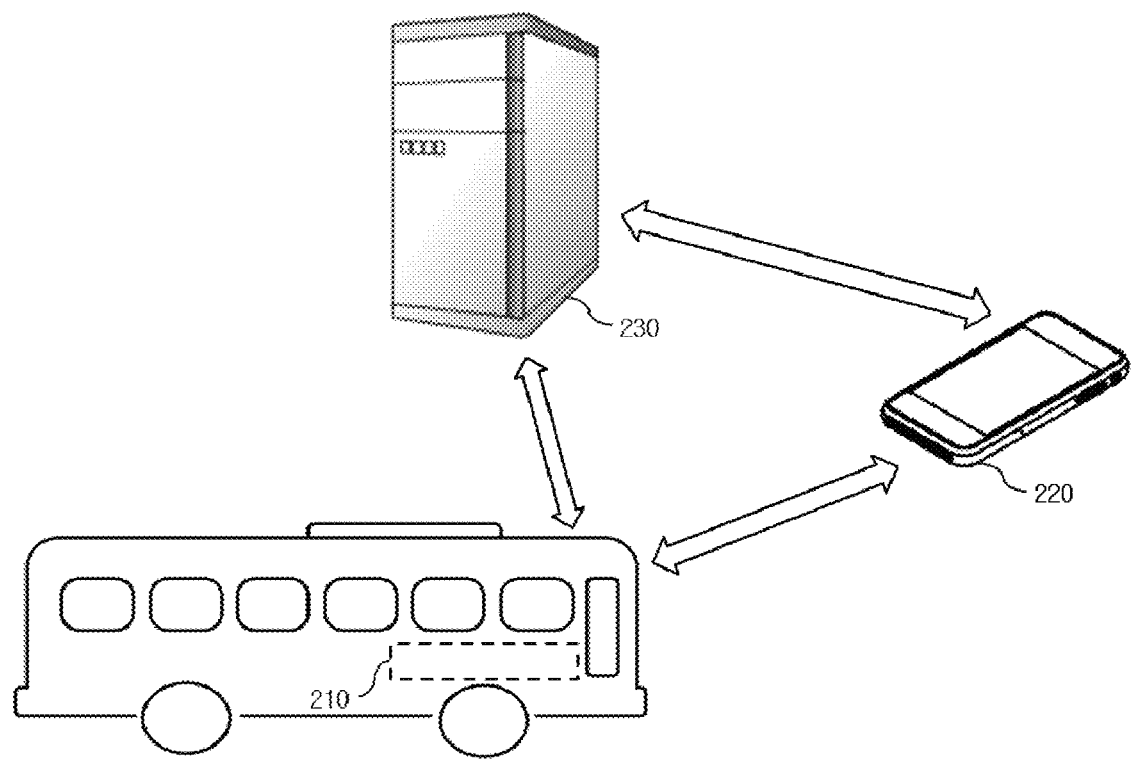
FIG. 2 is a system diagram for explanation of a method of providing a vehicle user interface using telematics according to exemplary embodiments of the present disclosure.

FIG. 2 is a structural diagram for an explanation of a method of providing a vehicle user interface using telematics according to exemplary embodiments of the present disclosure.

Referring to FIG. 2, a telematics module 210 installed in a vehicle may be connected to a telematics server 230 using wireless communication technology and may be connected to a user equipment (UE) 220 using wireless communication technology or short-range communication technology.

The telematics server 230 may be a network device managed for support of telematics technology installed in a vehicle and may store dedicated vehicle information, vehicle driving information, and so on. The telematics server 230 may be operatively associated with the vehicle through a wireless communication network during or before/after vehicle driving. The telematics server 230 may store information set by a driver (user) and facilitate a manipulation of devices/functions related to vehicle driving and safety. In particular, the UE 220 may turn on the vehicle through the telematics server 230 to operate an air conditioning system and to turn off the air conditioning system of the vehicle using the UE 220 when a driver (user) does not desire the operation of the air conditioning system.

However, according to exemplary embodiments of the present disclosure, any server may be used as long as the server provides a network that is capable of wirelessly communicating with the vehicle and the UE 220 and provides information stored in the server and is not limited to the telematics server 230. The general server may provide specific information to the vehicle or the UE 220 according to a transmission request for the specific information from the vehicle or the UE 220.

The UE 220 may be, for example, a smartphone portable by a user. The UE 220 may be operatively associated with the vehicle or the telematics server 230 through wireless communication technology and short-range communication technology and store or acquire dedicated vehicle information, driver personal information, and so on.

The UE 220 may function as an output and input device (e.g., display device) of an AVN system of the vehicle. In other words, the UE 220 may not be embedded and installed in the instrument panel as an output and input device of an AVN system of the vehicle, may function as a portable smartphone or portable PC outside the vehicle, and may also function as an output and input device of the AVN system of the vehicle upon being operatively associated with the AVN system of the vehicle.

In detail, when a driver connects the UE 220 used as a portable phone to the AVN system of the vehicle by wire or wirelessly, the UE 220 may output a navigation picture image.

According to the present disclosure, the UE 220 may function as an output and input device of the AVN system and output a button user interface (UI) of the instrument panel through the output and input device of the AVN system to provide a user interface related to the instrument panel to the driver.

In other words, when a user connects the UE 220 to the AVN system of the vehicle by wire or wirelessly, the UE 220 may output a button UI of the instrument panel and receive, or be notified of, whether each button is activated from the user.

According to exemplary embodiments of the present disclosure, a large number of buttons installed in an existing instrument panel may be provided as a button UI through the output and input device of the AVN system so as to overcome the problem in FIG. 1.

Figure 3:
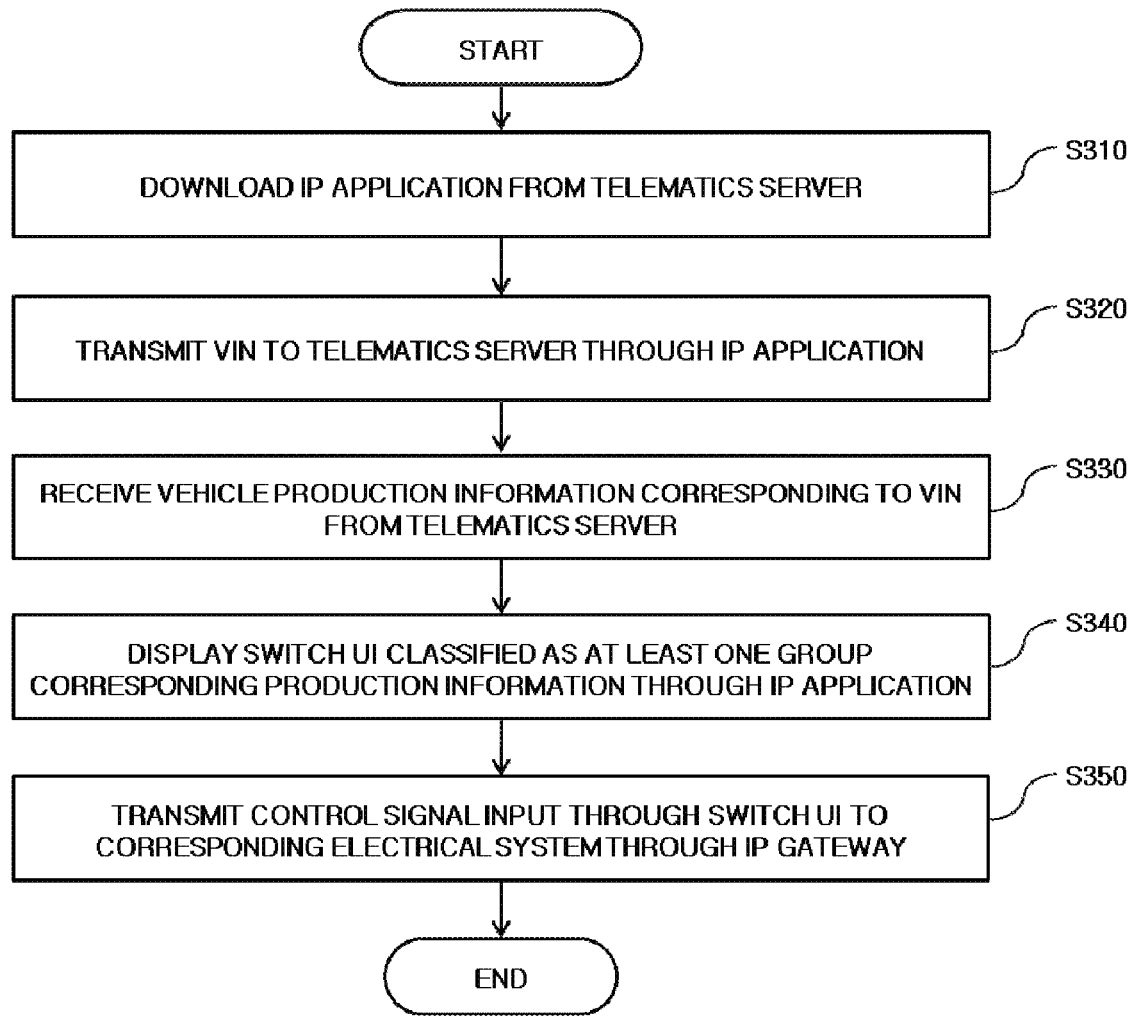
FIG. 3 is a flowchart for the explanation of a method of providing a vehicle user interface using telematics according to exemplary embodiments of the present disclosure.

FIG. 3 is a flowchart for an explanation of a method of providing a vehicle user interface using telematics according to exemplary embodiments of the present disclosure.

Referring to FIG. 3, a UE for outputting a button UI of an instrument panel to a display monitor or receiving input of the button UI for controlling whether the button UI of the instrument panel is activated from the user is defined as an instrument panel UE (hereinafter, "IP device").

The IP device may basically provide a button UI to a driver through an output and input device of an AVN system. The IP device may be operatively associated with the AVN system and may function as the output and input device.

In other words, the IP device may provide an output image of navigation data to a driver during driving and reproduce video or audio to provide the video or audio to the driver. However, according to exemplary embodiments of the present disclosure, the IP device may provide a user interface of a button UI installed on the instrument panel.

The IP device may be installed in the vehicle and may be operatively associated with the AVN system in a removable form. The IP device may be used as a handheld device before being connected to the vehicle and, upon being connected to the vehicle by wire or wirelessly, may function as the output and input device of the AVN system.

The IP device may download an instrument panel (IP) application from the telematics server (S310).

The IP device may include a wireless communication module installed therein and download an IP application directly from a telematics server through the wireless communication module. In addition, the IP device may receive an IP application using vehicle communication through the telematics module that is separately installed in the vehicle.

The IP application may be installed in the IP device or the AVN system and may include a user interface (UI) included in the instrument panel. The IP device may provide a button UI to the driver through the IP application and receive, or be notified of, whether the button UI is activated from the driver.

The IP device may transmit a vehicle identification number (VIN) to the telematics through the IP application (S320)

The driver may input a vehicle identification number (VIN) to the IP application output to the IP device and the IP device may transmit the received VIN to a telematics server through a telematics module. According to another exemplary embodiment of the present disclosure, a VIN may be transmitted to the telematics server through the wireless communication module included in the IP device.

The telematics server may receive the VIN and search for vehicle production information corresponding to the VIN in an internal or external database.

In general, the telematics server may have a database for managing and storing vehicle production information of a registered vehicle.

For example, the vehicle production information may include at least one of a vehicle identification number (VIN), a vehicle model code, identification information of a vehicle body (body number), identification information of an engine (or engine assembly) installed in a vehicle, transmission identification information (T/M_No), an export country, a detailed vehicle model code, or order option information (OCN).

The telematics server may receive the VIN and recognize a corresponding vehicle model code and detailed option information corresponding to functions included in the vehicle using the VIN.

A button UI of an instrument panel of a vehicle may be varied according to a vehicle model and an option function installed in the vehicle.

The telematics server may recognize the button UI of the instrument panel, which is differently identified according to a vehicle model and an optional function installed in the vehicle.

The telematics server may receive a VIN and re-transmit vehicle production information corresponding to the received VIN to the IP device but, according to another exemplary embodiment of the present disclosure, the telematics server may directly transmit a button UI of the instrument panel, corresponding to the production information. Upon receiving button UI information from the telematics server, the IP device may output a button UI using the received button UI information and provide the button UI to a driver.

The IP device may receive vehicle production information corresponding to the VIN from the telematics server (S330).

The IP device may search for button information of the instrument panel corresponding to the production information stored in an IP application using the received vehicle production information. The IP application may contain at least one vehicle model registered in the telematics server and button information of the instrument panel corresponding to an optional function.

In detail, the IP device may transmit the VIN from the telematics server and receive a vehicle model code and order option information (OCN) as the vehicle production information.

The IP application may contain specification information of electrical components installed in a vehicle and button UI information for controlling the electrical components according to the model code and the OCN. That is, the IP application may contain information on electrical components installed in a vehicle corresponding to the model code and the OCN and information on a button UI required for controlling the electrical components.

The IP device may search for a button UI of a corresponding vehicle from the IP application using the model code and the OCN.

The IP device may display a button UI that is classified as at least one group corresponding to production information through the IP application (S340).

The IP device may output the button UI of the instrument panel through a display.

The IP device may transmit a control signal input through the button UI to a corresponding electrical system through an IP gateway (S350).

Figure 4:
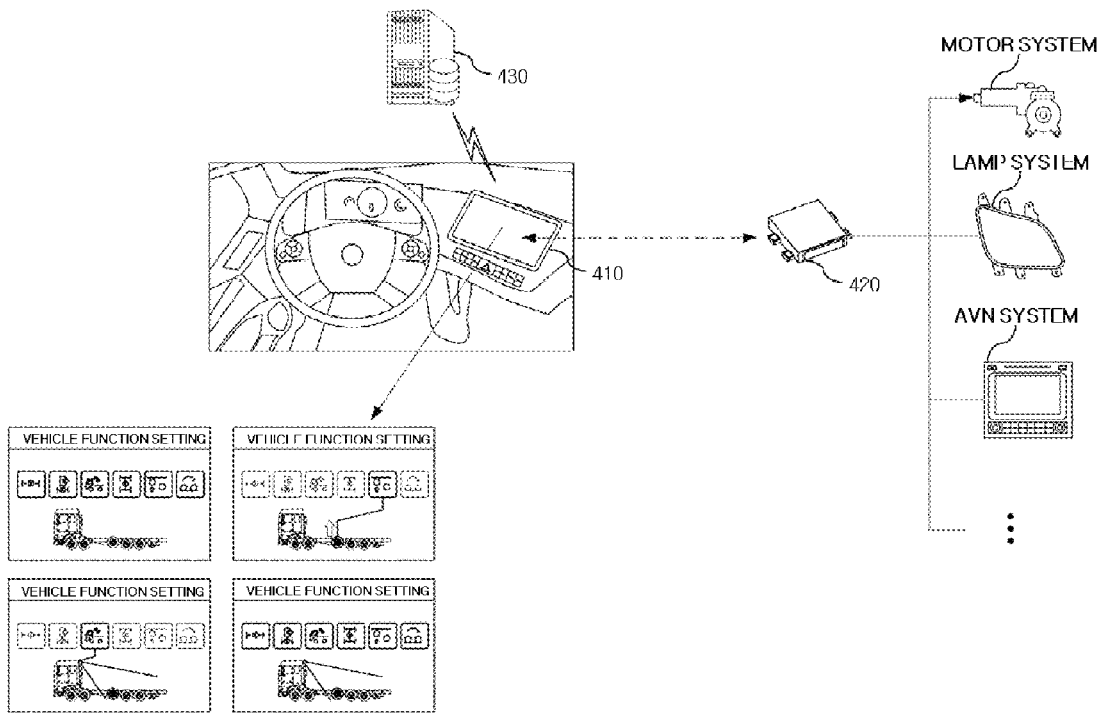
FIG. 4 is a system diagram for the explanation of a vehicle including an apparatus for providing a vehicle user interface using telematics according to exemplary embodiments of the present disclosure.

FIG. 4 is a structural diagram for an explanation of a vehicle including an apparatus for providing a vehicle user interface using telematics according to exemplary embodiments of the present disclosure.

Referring to FIG. 4, a telematics server 430 may transmit and receive signals and information for providing a button of an instrument panel to and from an IP device 410 through a telematics module. In addition, the IP device 410 may include an internal wireless communication module and may directly transmit and receive signals and information to and from the telematics server 430.

The IP device 410 may transmit a control signal to a plurality of electrical components installed in a vehicle and a gateway 420 may directly receive the control signal from the IP device 410 and may transmit the control signal to an electrical component as a destination of the corresponding control signal.

The IP device 410 may be a wireless communication device portable by a driver and may be, for example, a smartphone or a tablet PC.

When the IP device 410 is connected to the vehicle by wire or wirelessly, the IP device 410 may function as an output and input device of an AVN system of a vehicle, provide a button UI of an instrument panel, or function as an input device for receiving information on whether a button is activated, from a driver.

The gateway 420 that receives the control signal from the IP device 410 may convert information on whether an electrical component corresponding to each button is controlled into a message that matches vehicle communication (e.g., CAN communication and LIN communication) and transmits the message to an electrical system (e.g., a motor system, a lamp system, and an AVN system) of each destination.

Figure 5:
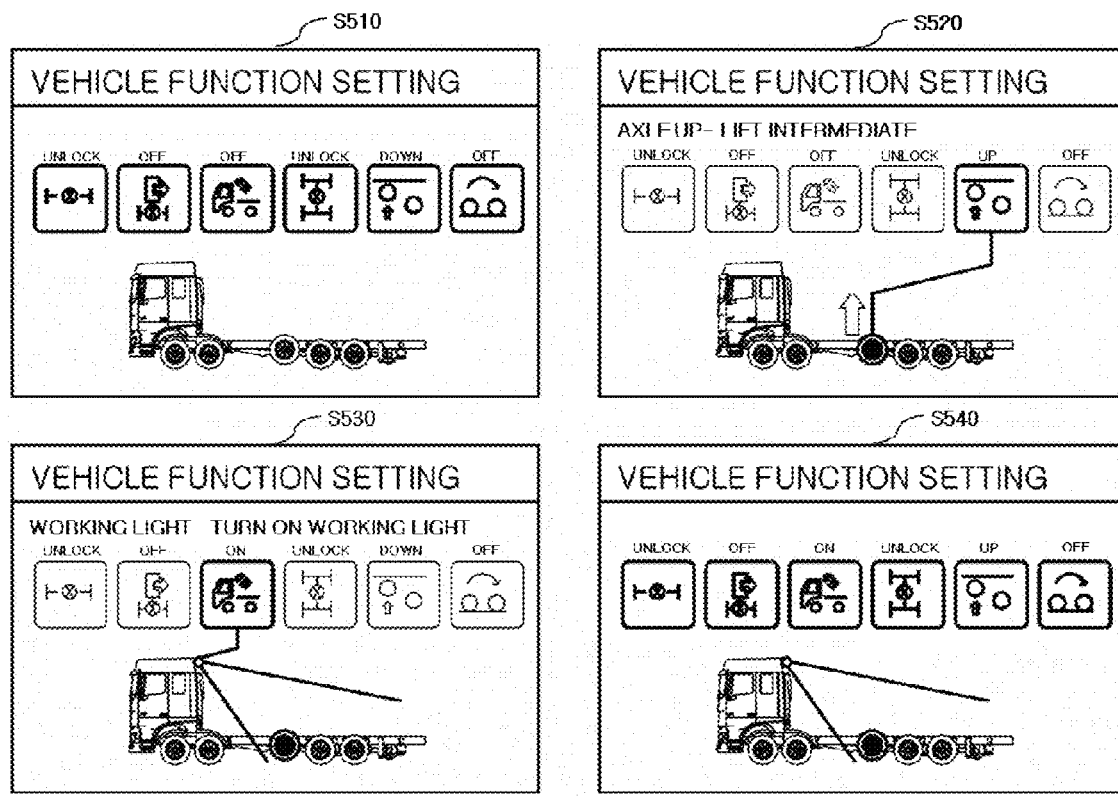
FIG. 5 is a diagram for the explanation of an output image of an AVN device according to exemplary embodiments of the present disclosure.

FIG. 5 is a diagram for an explanation of an output image of an AVN device according to exemplary embodiments of the present disclosure.

Referring to FIG. 5, button UIs of an instrument panel, which is output by an IP device, may be classified into groups for performing a similar function and output as groups.

The button UI may include an icon indicating a function of at least one electrical system installed in a vehicle. A driver may intuitively be apprised of a function of the button UI through an icon indicating a function.

For example, in the case of a large vehicle or a commercial vehicle, the button UI may include a cab tilting control button, a front panel open button, a vehicle door unlock or open button, a push axle down button of a lift axle vehicle, a parking brake lever release button, and so on.

S510 indicates a standby image before button UI manipulation of a driver. S520 indicates the case in which only a button UI "axle up" is input by a user and, in this case, only a region corresponding to the button UI "axle up" may be output darker than other button UIs. In addition, an arrow that allows the user to intuitively understand a function of an electrical component indicated by the button UI "axle up" may be output. In addition, an expression such as "Lift Intermediate Axle" for explanation of a function of the electrical component indicated by the button UI "axle up" may be output.

S530 indicates the case in which a button UI "working light" is input when a button UI "axle up" is input and, in this case, only a region corresponding to the button UI "working light" may be output darker than other button UIs. In addition, an animation effect that allows the user to intuitively understand a function of an electrical component indicated by the button UI "working light" may be output. In addition, an expression such as "Turn on Working Light" for explanation of a function of the electrical component indicated by the button UI "working light" may be output. However, when both the button UI "axle up" and the button UI "working light" are input, titles indicating the two button UIs may be highlighted with fluorescent color in order to indicate that the two button UIs are activated.

S540 indicates a standby image after manipulation and, in this case, a position of an electrical component of a vehicle is highlighted with fluorescent color in order to allow a driver to intuitively understand a function of the activated electrical component, compared with S510.

Figure 6:
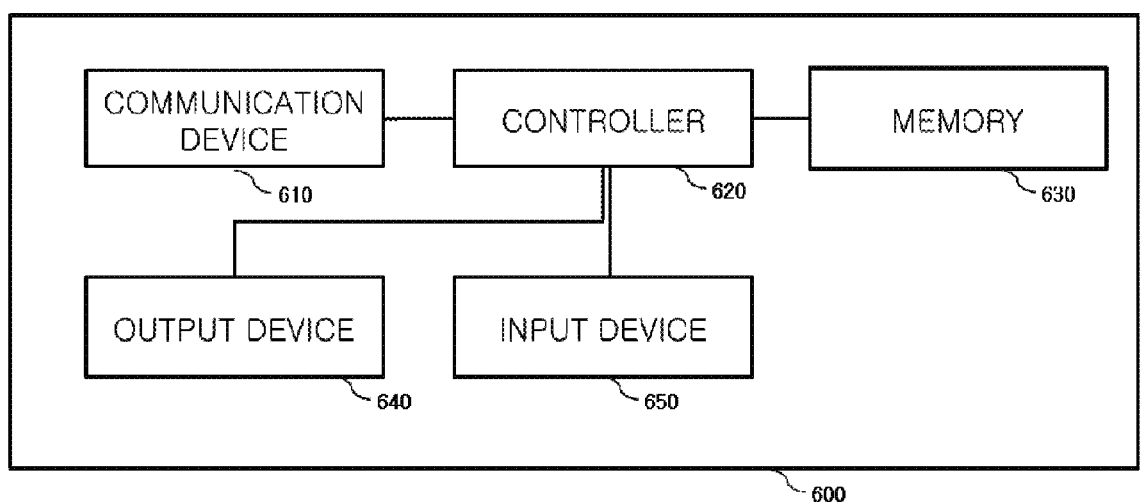
FIG. 6 is a schematic diagram for explanation of an apparatus for providing a vehicle user interface according to exemplary embodiments of the present disclosure.

FIG. 6 is a structural diagram for an explanation of an apparatus for providing a vehicle user interface according to exemplary embodiments of the present disclosure.

Referring to FIG. 6, an apparatus 600 for providing a vehicle user interface may include a communication device 610, a controller 620, a memory 630, an output device 640 and an input device 650.

The components illustrated in FIG. 6 are not a requirement and, thus, the apparatus 600 for providing a vehicle user interface, which includes greater or fewer components than in FIG. 6, is within the scope of this disclosure.

The communication device 610 may receive state information from various electrical systems of a vehicle through vehicle communication and transmit a signal for controlling each electrical system to each electrical system from the input device 650 through a gateway.

The communication device 610 may include a wireless communication module and may directly communicate with the telematics server to download an IP application.

The controller 620 may perform data processing and calculation in order to control the apparatus 600 for providing a vehicle user interface.

The memory 630 is a generic space and/or a storage region for storing a predetermined program code for control of an overall operation of the apparatus 600 for providing a vehicle user interface and input/output data, etc. during an operation based on the program code and may be provided in the form of an electrically erasable and programmable read only memory (EEPROM), flash memory (FM), hard disk drive, or the like.

The output device 640 may directly output and provide a button UI of an instrument panel to the driver.

The input device 650 may generate a control signal through each button UI selected by the user.

Figure 7:
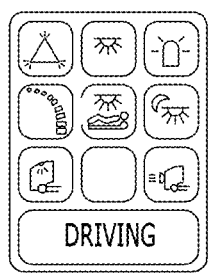
FIG. 7 is a diagram for explanation of an output image of an AVN device according to another exemplary embodiment of the present disclosure.
Figure 7:
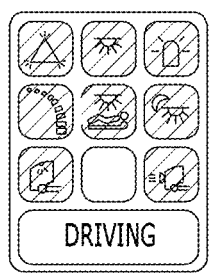
Figure 7:
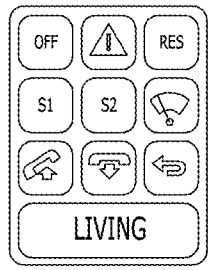
Figure 7:
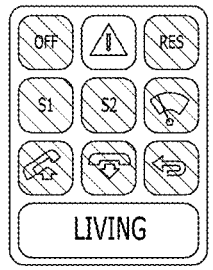

FIG. 7 is a diagram for an explanation of an output image of an AVN device according to exemplary embodiments of the present disclosure.

Referring to FIG. 7, an IP device may output a button UI of an instrument panel in the form of an icon to provide the button UI to the driver.

The aforementioned present disclosure can also be embodied as computer readable code stored on a computer readable recording medium. Examples of the computer readable recording medium include read-only memory (ROM), random-access memory (RAM), CD-ROM, magnetic tapes, floppy disks, optical data storage devices, carrier waves (e.g., transmission via the Internet), etc.

The computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

The method and apparatus for providing a vehicle user interface according to the present disclosure may have the following advantages.

First, according to the present disclosure, a user interface for providing various types of instrument panel buttons may be applied to one display so as to reduce mold costs for producing an instrument panel with an intricate shape.

Second, according to the present disclosure, material costs to produce a large number of buttons may be reduced.

Third, according to the present disclosure, the number of working steps needed to install various types of buttons on an instrument panel may be reduced and a problem in terms of inappropriate installation during installation of various types and large number of buttons may be overcome.

It will be appreciated by persons skilled in the art that that the effects that could be achieved with the present disclosure are not limited to what has been particularly described hereinabove and other advantages of the present disclosure will be more clearly understood from the above detailed description.

It will be apparent to those skilled in the art that various modifications and variations can be made in the present disclosure without departing from the spirit or scope of the disclosures. Thus, it is intended that the present disclosure cover the modifications and variations of this disclosure provided they come within the scope of the appended claims and their equivalents.

What is claimed is:

1. A method of controlling an instrument panel (IP) device, the method comprising:
    transmitting a vehicle identification number (VIN) to a telematics server through an IP application;
    receiving vehicle production information corresponding to the VIN from the telematics server;
    searching for a button user interface (UI) classified as at least one group using the received vehicle production information, wherein the button UI comprises an icon indicating a function of at least one electrical system installed in a vehicle; and
    displaying the button UI classified as the at least one group corresponding to the vehicle production information through the IP application,
    wherein the button UI is configured to variably adjust according to the vehicle production information.

2. The method according to claim 1, further comprising transmitting a control signal input through the button UI to the at least one electrical system corresponding to the control signal through an IP gateway.

3. The method according to claim 1, further comprising downloading the IP application from the telematics server.

4. The method according to claim 1, wherein the IP application comprises each button UI for controlling the at least one electrical system installed in the vehicle.

5. The method according to claim 1, wherein the vehicle production information comprises at least one of vehicle model identification (ID), a vehicle body number, engine ID, transmission ID, an export country, a detailed vehicle model or an order option.

6. A method of controlling an instrument panel (IP) device, the method comprising:
    transmitting a vehicle identification number (VIN) to a telematics server through an IP application;
    receiving information on a button user interface (UI) classified as at least one group corresponding to the VIN from the telematics server, wherein the button UI comprises an icon indicating a function of at least one electrical system installed in a vehicle; and displaying the button UI through the IP application using the information of the button UI, wherein the receiving information comprises:
- receiving vehicle production information corresponding to the VIN searched by the telematics server, and
- searching information on the button UI classified as the at least one group using the received vehicle production information, and wherein the button UI is configured to variable adjust according to the vehicle production information.

7. The method according to claim 6, further comprising transmitting a control signal input through the button UI to the electrical system corresponding to the control signal through an IP gateway.

8. The method according to claim 6, further comprising downloading the IP application from the telematics server.

9. The method according to claim 6, wherein the IP application comprises the button UI for controlling the at least one corresponding electrical system installed in the vehicle.

10. The method according to claim 6, wherein the vehicle production information comprises at least one of a vehicle model identification (ID), a vehicle body number, engine ID, transmission ID, an export country, a detailed vehicle model or an order option.

11. An instrument panel (IP) device comprising:
- an input device for receiving a vehicle identification number (VIN) transmitted to a telematics server;
- a communication device for receiving vehicle production information corresponding to the VIN from the telematics server;
- a controller for searching information on a button user interface (UI) classified as at least one group using the received vehicle production information in a memory, wherein the button UI comprises an icon indicating a function of at least one electrical system installed in a vehicle; and
- an output device for displaying the button UI classified as the at least one group corresponding to the vehicle production information, wherein the button UI is configured to variable adjust according to the vehicle production information.

12. The IP device according to claim 11, wherein the controller performs a control to transmit a control signal input through the button UI to the at least one electrical system corresponding to the control signal through an IP gateway.

13. The IP device according to claim 11, wherein the button UI generates a control signal for controlling the at least one electrical system installed the vehicle.

14. The IP device according to claim 11, wherein the vehicle production information comprises at least one of a vehicle model identification (ID), a vehicle body number, engine ID, transmission ID, an export country, a detailed vehicle model or an order option.

* * * * *